(12) United States Patent
Sasaki et al.

(10) Patent No.: US 8,294,985 B2
(45) Date of Patent: Oct. 23, 2012

(54) LASER MICROSCOPE APPARATUS

(75) Inventors: Hiroshi Sasaki, Tokyo (JP); Hirokazu Kubo, Tokyo (JP)

(73) Assignee: Olympus Corporation, Tokyo (JP)

( * ) Notice: Subject to any disclaimer, the term of this patent is extended or adjusted under 35 U.S.C. 154(b) by 554 days.

(21) Appl. No.: 12/568,775

(22) Filed: Sep. 29, 2009

(65) Prior Publication Data
US 2010/0079857 A1    Apr. 1, 2010

(30) Foreign Application Priority Data
Oct. 1, 2008 (JP) .................................. 2008-256253

(51) Int. Cl.
*G02B 21/06* (2006.01)
(52) U.S. Cl. .................. 359/385; 359/368; 359/389
(58) Field of Classification Search .................. None
See application file for complete search history.

(56) References Cited

U.S. PATENT DOCUMENTS

| | | | |
|---|---|---|---|
| 6,674,573 B2 | 1/2004 | Suzuki | |
| 7,009,171 B2 * | 3/2006 | Sasaki | 250/234 |
| 7,301,626 B2 | 11/2007 | Tsuchiya et al. | |
| 2008/0144028 A1 * | 6/2008 | Gruler | 356/317 |

FOREIGN PATENT DOCUMENTS

| | | |
|---|---|---|
| JP | 2003-057554 A | 2/2003 |
| JP | 2004-086009 | 3/2004 |
| JP | 2006-039132 A | 2/2006 |

* cited by examiner

*Primary Examiner* — Lee Fineman
(74) *Attorney, Agent, or Firm* — Holtz, Holtz, Goodman & Chick, PC

(57) ABSTRACT

Observation is performed using bright, clear multiphoton fluorescence images produced by efficiently generating a multiphoton excitation effect, without the need for a complex interference film structure. The invention employs a laser microscope apparatus including a first dichroic mirror that reflects visible laser light guided via a first light path and that transmits IR pulsed laser light guided via a second light path to combine the first light path and the second light path; an XY galvanometer mirror that scans the laser light from the first dichroic mirror on a specimen; an objective lens that irradiates the specimen with the scanned laser light and that collects fluorescence produced in the specimen; a second dichroic mirror that reflects the visible laser light and transmits the fluorescence from the specimen; and a detection unit that detects the fluorescence transmitted through the second dichroic mirror.

8 Claims, 2 Drawing Sheets excitation effect is observed. An excitation dichroic mirror that reflects laser wavelengths and transmits the fluorescence coming from the specimen is provided in the combined laser light path.

LASER MICROSCOPE APPARATUS

BACKGROUND OF THE INVENTION

1. Field of the Invention

The present invention relates to a laser microscope apparatus.

This application is based on Japanese Patent Application No. 2008-256253, the content of which is incorporated herein by reference.

2. Description of Related Art

There is a known laser microscope apparatus in the related art which is provided with two light paths via which laser light in different frequency bands is guided and a dichroic mirror that reflects the laser light in one light path and transmits the laser light in the other light path to combine the two light paths (for example, see Japanese Unexamined Patent Application, Publication No. 2004-86009). In this laser microscope apparatus, a specimen is irradiated with infrared pulsed laser light being used as the laser light guided via the first light path, and fluorescence produced by a multiphoton excitation effect is observed. An excitation dichroic mirror that reflects laser wavelengths and transmits the fluorescence coming from the specimen is provided in the combined laser light path.

In the laser microscope apparatus described above, normally the excitation dichroic mirror is designed to reflect the laser light and transmit the fluorescence from the specimen. By doing so, because the reflectance characteristic of the interference film used in the reflecting surface of the dichroic mirror allows reflection of only the narrow-wavelength-band laser light and allows transmission of the rest of the band containing the fluorescence, the design of the interference film can be simplified.

However, because the interference film of the dichroic mirror is constructed of a multilayer film, in the reflection light path, the group velocity dispersion is large only in a particular wavelength region. This is influenced by the fact that the optical path length for each wavelength varies greatly due to the reflection at each layer in the multilayer film. Ultrashort pulsed laser light with a pulse width of approximately 100 fs used in multiphoton-fluorescence observation normally has a wavelength band of about 10 nm; therefore, if the wavelength region where the group velocity dispersion is large is contained within this wavelength range, the ultrashort pulsed laser light reflected at this multilayer film experiences a large chirp, increasing the pulse width. Moreover, because this chirp is a nonlinear chirp, it cannot be compensated for with a linear chirp correction method using, for example, a prism pair. Therefore, because the increase in pulse width cannot be compensated for, there is a drawback in that it is not possible to efficiently generate the multiphoton excitation effect.

BRIEF SUMMARY OF THE INVENTION

An object of the present invention is to provide a laser microscope apparatus that can perform observation with bright, clear multiphoton fluorescence images obtained by efficiently generating a multiphoton fluorescence effect, without the need for a complex interference film structure.

A first aspect of the present invention is a laser microscope apparatus including a first light path via which visible laser light is guided; a second light path via which ultrashort pulsed laser light is guided; a first dichroic mirror that reflects the visible laser light guided via the first light path and that transmits the ultrashort pulsed laser light guided via the second light path to combine the first light path and the second light path; a scanning device that two-dimensionally scans the laser light from the first dichroic mirror on a specimen; an observation optical system that irradiates the specimen with the laser light scanned by the scanning device and that collects fluorescence produced in the specimen; a second dichroic mirror that reflects the visible laser light and transmits the fluorescence from the specimen; and a detector that detects the fluorescence transmitted through the second dichroic mirror, wherein the first dichroic mirror is provided between the scanning device and the second dichroic mirror and reflects the fluorescence coming from the specimen towards the second dichroic mirror.

According to the first aspect of the present invention, the visible laser light guided via the first light path is reflected by the first dichroic mirror and the second dichroic mirror, is scanned by the scanning device, and is radiated onto the specimen by the observation optical system. On the other hand, the ultrashort pulsed laser light guided via the second light path is transmitted through the first dichroic mirror, is scanned by the scanning device, and is radiated onto the specimen by the observation optical system. The fluorescence produced in the specimen by irradiation with the visible laser light and the ultrashort pulsed laser light is collected by the observation optical system, is transmitted through the second dichroic mirror, and is detected by the detector.

In this case, the ultrashort pulsed laser light is radiated onto the specimen without the involvement of reflection at individual dichroic mirrors formed of multilayer films; therefore, it is possible to prevent optical path length variations at each wavelength due to reflection and to prevent pulse width broadening due to group velocity dispersion of the ultrashort pulsed laser light. As a result, it is possible to efficiently generate a multiphoton excitation effect in the specimen and to perform observation with bright, clear multiphoton fluorescence images.

By reflecting the visible light and transmitting the fluorescence coming from the specimen at the second dichroic mirror, it is possible to narrow the reflection band of the narrow-wavelength-range visible laser light and to widen the transmission band of the fluorescence, which can simplify the design of the interference film in the second dichroic mirror. In particular, when observing fluorescence from a multi-stained specimen, it is necessary to use visible laser light in a plurality of wavelength regions to excite each fluorescent material. In this case, the second dichroic mirror should be designed to reflect only the wavelengths of the visible light and to transmit the other fluorescence wavelength regions; therefore, it is possible to simplify the design of the interference film thereof.

In the first aspect described above, the second dichroic mirror may include a plurality of dichroic mirror parts having different spectral transmittance characteristics; and a switching unit that switches among the plurality of dichroic mirror parts.

With this configuration, using the switching unit to switch among the plurality of dichroic mirror parts having different spectral transmittance characteristics according to the wavelength of the visible light to change the wavelength of the visible light depending on the observed object makes it possible to observe various types of object.

A second aspect of the present invention is a laser microscope apparatus including a first light path via which visible laser light is guided; a second light path via which ultrashort pulsed laser light is guided; a first dichroic mirror that reflects the visible laser light guided via the first light path and that transmits the ultrashort pulsed laser light guided via the second light path to combine the first light path and the second light path; a scanning device that two-dimensionally scans the laser light from the first dichroic mirror on a specimen; an observation optical system that irradiates the specimen with the laser light scanned by the scanning device and that collects fluorescence produced in the specimen; a second dichroic mirror that reflects the fluorescence from the specimen and that transmits the ultrashort pulsed laser light; and a detector that detects the fluorescence reflected by the second dichroic mirror, wherein the first dichroic mirror is provided between the scanning device and the second dichroic mirror and transmits the fluorescence coming from the specimen.

According to the second aspect of the present invention, the visible laser light guided via the first light path is reflected by the first dichroic mirror, is scanned by the scanning device, and is radiated onto the specimen by the observation optical system. On the other hand, the ultrashort pulsed laser light guided via the second light path is transmitted through the first dichroic mirror and the second dichroic mirror, is scanned by the scanning device, and is radiated onto the specimen by the observation optical system. Fluorescence produced in the specimen by irradiation with the visible laser light and the ultrashort pulsed laser light is transmitted through the first dichroic mirror, is reflected by the second dichroic mirror, and is detected by the detector.

In this case, the ultrashort pulsed laser light is radiated onto the specimen without the involvement of reflection at individual dichroic mirrors formed of multilayer films; therefore, it is possible to prevent optical path length variations at each wavelength due to reflection and to prevent pulse width broadening due to group velocity dispersion of the ultrashort pulsed laser light. As a result, it is possible to efficiently generate a multiphoton excitation effect in the specimen, enabling observation with bright, clear multiphoton fluorescence images.

By reflecting the visible light and transmitting the fluorescence from the specimen at the first dichroic mirror, it is possible to narrow the reflection band of the narrow-wavelength-range visible light and to widen the transmission band of the fluorescence, which makes it possible to simplify the design of the interference film in the first dichroic mirror.

In the second aspect described above, the first dichroic mirror may include a plurality of dichroic mirror parts having different spectral transmittance characteristics; and a switching unit that switches among the plurality of dichroic mirror parts.

With this configuration, using the switching unit to switch among the plurality of dichroic mirror parts having different spectral transmittance characteristics according to the wavelength of the visible light to change the wavelength of the visible light depending on the observed object makes it possible to observe various types of object.

In the first and second aspects described above, the first dichroic mirror and the scanning device may be provided in a straight-through light path portion of the second light path.

By doing so, it is possible to simplify optical axis alignment of the ultrashort pulsed laser light guided via the second light path relative to the scanning device.

The first and second aspects described above may further include a third dichroic mirror that is provided, in an insertable fashion, between the scanning device and the specimen, that reflects the fluorescence coming from the specimen, and that transmits the ultrashort pulsed laser light; and a non-descan detection unit that detects the fluorescence reflected by the third dichroic mirror.

By doing so, the fluorescence produced in the specimen by irradiation with the ultrashort pulsed laser light can be reflected by the third dichroic mirror without returning to the scanning device and can be detected by the non-descan detection unit. During this time, by irradiating the specimen with the ultrashort pulsed laser light without reflecting it at the third dichroic mirror, it is possible to prevent pulse width broadening of the ultrashort pulsed laser light at a specific wavelength, thus making it possible to more efficiently generate the multiphoton excitation effect.

The present invention affords an advantage in that it is possible to efficiently generate a multiphoton excitation effect, thus enabling observation with bright, clear multiphoton fluorescence images, without the need for a complex interference film structure.

DETAILED DESCRIPTION OF THE INVENTION

First Embodiment

A laser microscope apparatus 1 according to a first embodiment of the present invention will be described below with reference to the drawings.

Figure 1:
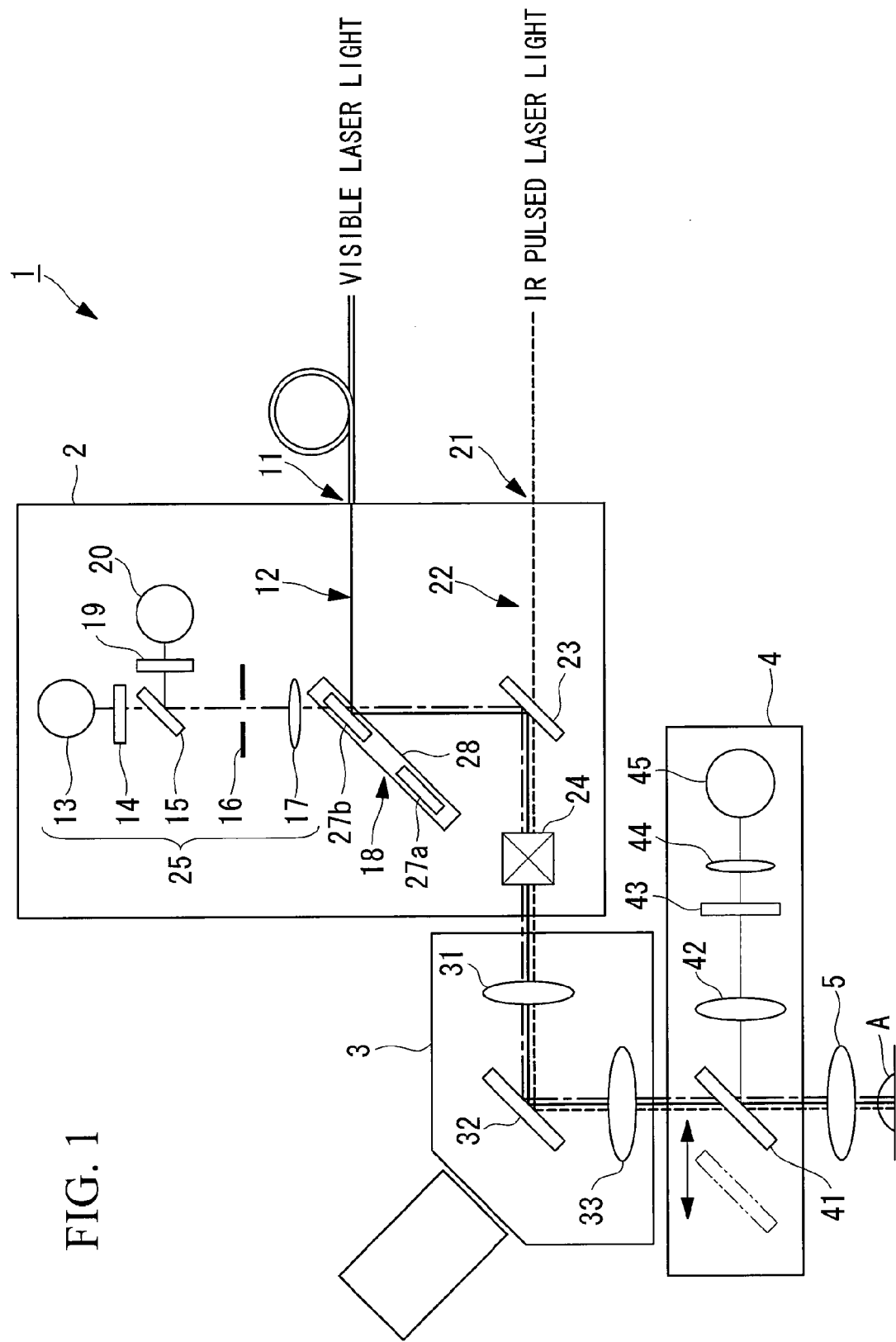
FIG. 1 is a block diagram showing the overall configuration of a laser microscope apparatus according to a first embodiment of the present invention.

As shown in FIG. 1, the laser microscope apparatus 1 according to this embodiment includes a scanning unit 2 that scans input laser light, a observation tube 3 that has a plurality of lenses and that guides the laser light from the scanning unit 2, an objective lens (observation optical system) 5 that irradiates a specimen A with the laser light guided by the observation tube 3 and that collects fluorescence produced in the specimen A, and a non-descan detection unit 4 provided between the observation tube 3 and the objective lens 5.

The scanning unit 2 includes a VIS port 11 to which visible laser light is input, a first light path 12 via which the visible laser light input to the VIS port 11 is guided, an IR port 21 to which IR pulsed laser light (near-infrared ultrashort pulsed laser light) is input, and a second light path 22 via which the IR pulsed laser light input to the IR port 21 is guided. Here, the IR pulsed laser light is pulsed laser light with a pulse width of about 100 fs and is wavelength tunable in a range of, for example, 700 nm to 1000 nm, depending on the type of fluorescent material.

The scanning unit 2 includes a first dichroic mirror 23 that reflects the visible laser light guided via the first light path 12 and transmits the IR pulsed laser light guided via the second light path 22 to combine the first light path 12 and the second light path 22, and an XY galvanometer mirror (scanning device) 24 that two-dimensionally scans the laser light from the first dichroic mirror 23 on the specimen A.

The scanning unit 2 also includes a second dichroic mirror 18, provided in the first light path 12, that reflects the visible laser light guided via the first light path 12 towards the first dichroic mirror 23 and that transmits fluorescence from the specimen, and a detection unit (detector) 25 that detects the fluorescence transmitted through the second dichroic mirror 18.

The first dichroic mirror 23 and the XY galvanometer mirror 24 are provided in a straight-through light path portion of the second light path 22. Accordingly, it is possible to facilitate optical axis alignment of the IR pulsed laser light guided via the second light path 22 relative to the XY galvanometer mirror 24.

The first dichroic mirror 23 is provided between the second dichroic mirror 18 and the XY galvanometer mirror 24 and reflects fluorescence coming from the specimen A towards the second dichroic mirror 18.

The XY galvanometer mirror 24 has a pair of galvanometer mirrors (not shown in the drawings) with, for example, silver coatings, and is driven in a raster scanning fashion by changing the oscillation angles of this pair of galvanometer mirrors. Accordingly, the visible laser light or the IR pulsed laser light from the first dichroic mirror 23 can be two-dimensionally scanned on the specimen A.

The second dichroic mirror 18 includes a turret 28, a plurality of dichroic mirror parts 27a and 27b secured in the turret 28 and having different transmittance characteristics, and a rotating mechanism (switching unit; not illustrated) that rotates the turret 28. By driving the rotating mechanism, the second dichroic mirror 18 can switch among the plurality of dichroic mirror parts 27a and 27b according to the wavelength of the visible laser light guided via the first light path 12.

The detection unit 25 includes a confocal lens 17 that focuses the fluorescence transmitted through the second dichroic mirror 18, a pinhole 16 through which only the fluorescence produced at the focal plane in the specimen passes, a light-splitting dichroic mirror 15 that splits the light passing through the pinhole 16, a first barrier filter 14 that blocks unwanted light from the fluorescence split by the light-splitting dichroic mirror 15, and a first light detector 13 that detects the fluorescence transmitted through the first barrier filter 14. Reference numeral 19 is a second barrier filter, and reference numeral 20 is a second, light detector. The first light detector 13 and the second light detector 20 are constructed, for example, of photomultiplier tubes.

The observation tube 3 includes an image-forming lens 33 that images the fluorescence collected by the objective lens 5, a pupil-projection lens 31 that substantially collimates the fluorescence imaged by the image-forming lens 33, and a reflecting mirror 32 that is provided between the image-forming lens 33 and the pupil-projection lens 31 and that deflects the fluorescence from the specimen A.

The non-descan detection unit 4 includes a third dichroic mirror 41 provided, in an insertable fashion, between the objective lens 5 and the observation tube 3, a third light detector 45 that detects the fluorescence reflected by the third dichroic mirror 41, and projection lenses 42 and 44 and a barrier filter 43 provided between the third dichroic mirror 41 and the third light detector 45. The third dichroic mirror 41 reflects fluorescence from the specimen A and transmits IR pulsed laser light.

The operation of the thus-configured laser microscope apparatus 1 according to this embodiment will be described below.

First, the case where multiphoton-fluorescence observation of the specimen A is performed with the detection unit 25 using the laser microscope apparatus 1 according to this embodiment will be described.

In this case, a laser light source (not illustrated) is operated to introduce IR pulsed laser light to the IR port 21. The IR pulsed laser light guided from the IR port 21 to the second light path 22 is transmitted through the first dichroic mirror 23 and is guided to the XY galvanometer mirror 24. At the XY galvanometer mirror 24, the IR pulsed laser light is two-dimensionally scanned on the specimen A. The IR pulsed laser light scanned in this way is transmitted through the pupil-projection lens 31, is deflected by the reflecting mirror 32, is transmitted through the image-forming lens 33, and thereafter is radiated onto the specimen A by the objective lens 5.

At the focal plane of the objective lens 5 in the specimen A, the photon density of the IR pulsed laser light is high, producing a multiphoton excitation effect and exciting fluorescent material in the specimen A, thus generating multiphoton fluorescence. The generated multiphoton fluorescence is collected by the objective lens 5, is imaged by the image-forming lens 33, and is deflected by the reflecting mirror 32. The deflected multiphoton fluorescence is substantially collimated by the pupil-projection lens 31 and is guided to the XY galvanometer mirror 24. The multiphoton fluorescence passing via the XY galvanometer mirror 24 is reflected by the first dichroic mirror 23, is transmitted through the second dichroic mirror 18, and is guided to the detection unit 25.

The multiphoton fluorescence guided to the detection unit 25 is focused by the confocal lens 17, and only multiphoton fluorescence generated at the focal plane in the specimen A passes through the pinhole 16. The multiphoton fluorescence passing through the pinhole 16 is transmitted through the light-splitting dichroic mirror 15 and the first barrier filter 14, thereby blocking unwanted light, and is detected as fluorescence intensity information by the first light detector 13.

By storing the intensity information of the multiphoton fluorescence detected by the first light detector 13 in this way in association with the irradiation position of the IR pulsed laser light by the XY galvanometer mirror 24, it is possible to construct a two-dimensional multiphoton fluorescence image.

Note that the multiphoton fluorescence from the specimen A may be reflected by the light-splitting dichroic mirror 15 and detected by the second light detector 20.

In the multiphoton-fluorescence observation described above, non-descan detection can also be performed using the third light detector 45. In this case, the non-descan detection unit 4 is operated to move the third dichroic mirror 41 into the light path of the IR pulsed laser light and the fluorescence from the specimen A.

The IR pulsed laser light guided through the observation tube 3 and transmitted through the third dichroic mirror 41 is focused on the specimen A by the objective lens 5. The multiphoton fluorescence generated in the specimen A thereby is collected by the objective lens 5 and is reflected towards the third light detector 45 by the third dichroic mirror 41. The reflected multiphoton fluorescence is transmitted through the projection lenses 42 and 44 and the barrier filter 43 and is then detected by the third light detector 45.

As described above, by detecting the fluorescence produced in the specimen A with the third light detector 45, without the fluorescence returning to the XY galvanometer mirror 24, signal attenuation in the optical components can be minimized, which improves the signal-to-noise ratio (S/N) of the multiphoton fluorescence. With non-descan detection, it is not possible to extract only the multiphoton fluorescence produced at the focal plane in the specimen A with a confocal pinhole; however, because fluorescence due to multiphoton excitation is produced only in the extreme vicinity of the focal position of the IR pulsed laser light, it is possible to obtain an optical cross-sectional image of the specimen A even without a confocal pinhole.

Next, the case where visible-light observation of the specimen A is carried out using the laser microscope apparatus 1 according to this embodiment will be described.

In this case, a laser light source (not illustrated) is operated to introduce visible laser light to the VIS port 11. The visible laser light guided to the first light path 12 from the VIS port 11 is reflected towards the first dichroic mirror 23 by the second dichroic mirror 18. The reflected visible laser light is reflected towards the XY galvanometer mirror 24 by the first dichroic mirror 23 and is guided to the XY galvanometer mirror 24. At the XY galvanometer mirror 24, the visible laser light is two dimensionally scanned on the specimen A. The visible laser light scanned in this way is transmitted through the pupil-projection lens 31, is deflected by the reflecting mirror 32, is transmitted through the image-forming lens 33, and is then radiated onto the specimen A by the objective lens 5.

At the focal plane of the objective lens 5 in the specimen A, fluorescent material in the specimen A is excited, producing fluorescence. The fluorescence produced is collected by the objective lens 5, is imaged by the image-forming lens 33, and is deflected by the reflecting mirror 32. The deflected fluorescence is substantially collimated by the pupil-projection lens 31 and guided to the XY galvanometer mirror 24. The fluorescence passing via the XY galvanometer mirror 24 is reflected by the first dichroic mirror 23, is transmitted through the second dichroic mirror 18, and is guided to the detection unit 25.

The fluorescence guided to the detection unit 25 is focused by the confocal lens 17, and only fluorescence produced at the focal plane in the specimen A is transmitted through the pinhole 16. The fluorescence transmitted through the pinhole 16 is transmitted through the light-splitting dichroic mirror 15 and the first barrier filter 14, thereby blocking unwanted light, and is detected as fluorescence intensity information by the first light detector 13.

By storing the intensity information of the fluorescence detected by the first light detector 13 in this way in association with the irradiation position of the visible laser light by the XY galvanometer mirror 24, it is possible to construct a two-dimensional fluorescence image.

Note that the fluorescence from the specimen A may be reflected by the light-splitting dichroic mirror 15 and detected by the second light detector 20.

As a result, with the laser microscope apparatus 1 according to this embodiment, during multiphoton-fluorescence observation, the IR pulsed laser light is radiated onto the specimen A without the involvement of reflection at individual dichroic mirrors formed of multilayer films. Hence, optical path length variations at each wavelength due to reflection can be prevented, and pulse width broadening due to group velocity dispersion of the IR pulsed laser light can be prevented. As a result, it is possible to efficiently bring about a multiphoton excitation effect in the specimen A, thus allowing observation with bright, clear multiphoton fluorescence images.

While carrying out visible-light observation, by reflecting the visible laser light and transmitting the fluorescence from the specimen A with the second dichroic mirror 18, it is possible to narrow the reflection band of the narrow-wavelength-band visible laser light and to widen the transmission band; therefore, it is possible to simplify the design of the interference film in the second dichroic mirror 18. In particular, when observing the fluorescence from a multistained specimen A, it is necessary to use visible laser light having a plurality of wavelength bands for exciting each type of fluorescent material. In this case, because the second dichroic mirror 18 should be designed to reflect only the wavelengths of the visible light used and to transmit the fluorescence from the specimen A, it is possible to simplify the design of the interference film in the second dichroic mirror 18.

By constructing the second dichroic mirror 18 so as to be capable of switching between the plurality of dichroic mirror parts 27a and 27b having different transmittance characteristics according to the wavelength of the visible laser light, it is possible to switch between the plurality of dichroic mirror parts 27a and 27b having different transmittance characteristics. Accordingly, it is possible to change the wavelength of the visible laser light according to the observed object and to produce fluorescence by irradiating the specimen with this visible laser light, which makes it possible to observe various kinds of objects.

Second Embodiment

Next, a laser microscope apparatus 51 according to a second embodiment of the present invention will be described with reference to the drawings.

The difference between the laser microscope apparatus 51 according to this embodiment and that according to the first embodiment is that fluorescence from the specimen A is transmitted at a dichroic mirror combining the light paths of the visible laser light and the IR pulsed laser light. In the following description of the laser microscope apparatus 51 according to this embodiment, a description of parts that are the same as those in the first embodiment will be omitted, and mainly the differences will be described.

Figure 2:
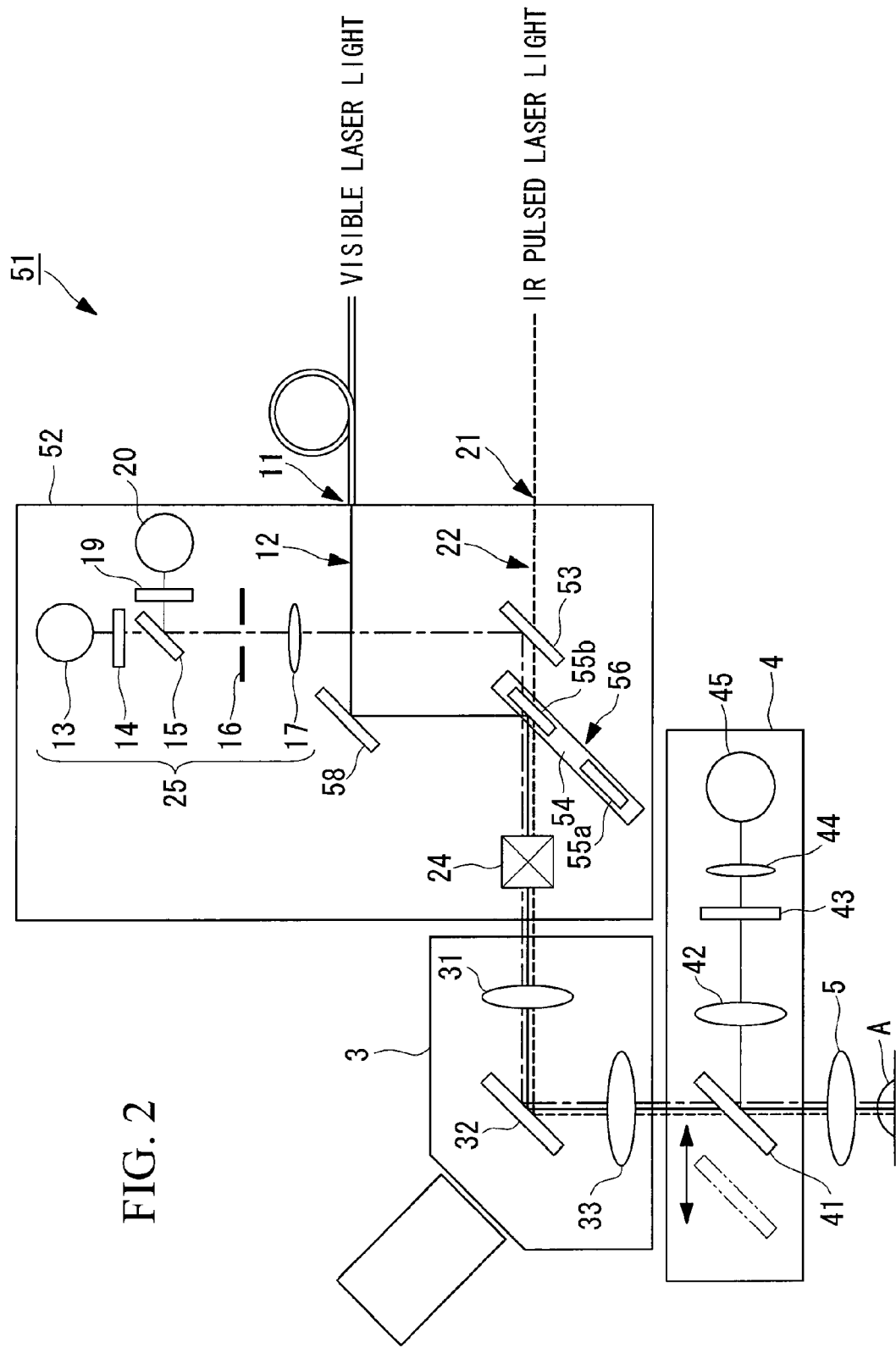
FIG. 2 is a block diagram showing the overall configuration of a laser microscope apparatus according to a second embodiment of the present invention.

As shown in FIG. 2, the laser microscope apparatus 51 according to this embodiment includes a scanning unit 52 that scans input laser light, a observation tube 3 that has a plurality of lenses and that guides light from the scanning unit 52, an objective lens (observation optical system) 5 that irradiates a specimen A with the laser light guided by the observation tube 3 and that collects fluorescence produced in the specimen A, and a non-descan detection unit 4 provided between the observation tube 3 and the objective lens 5.

The scanning unit 52 includes a reflecting mirror 58, provided in a first light path 12, that reflects visible laser light guided via the first light path 12 towards a dichroic mirror 56; and a second dichroic mirror 53, provided in a second light path 22, that transmits IR pulsed laser light guided via the second light path 22.

The scanning unit 52 includes the first dichroic mirror 56 that reflects visible laser light guided via the first light path 12 and transmits IR pulsed laser light guided via the second light path 22 to combine the first light path 12 and the second light path 22, and an XY galvanometer mirror (scanning device) 24 that two-dimensionally scans the laser light coming from the first dichroic mirror 56 on the specimen A.

The first dichroic mirror 56 is provided between the second dichroic mirror 53 and the XY galvanometer 24 and transmits fluorescence coming from the specimen A. The second dichroic mirror 53 reflects the fluorescence transmitted through the first dichroic mirror 56 towards the detection unit (detector) 25.

The first dichroic mirror 56 includes a turret 54, a plurality of dichroic mirror parts 55a and 55b having different transmittance characteristics, which are secured in the turret 54, and a rotating mechanism (switching unit; not illustrated) that rotates the turret 54. By driving the rotating mechanism, the first dichroic mirror 56 can switch among the plurality of dichroic mirror parts 55a and 55b according to the wavelength of the visible light guided via the first light path 12.

The operation of the thus-configured laser microscope apparatus 51 according to this embodiment will be described below.

First, the case where multiphoton-fluorescence observation of the specimen A is performed with the detection unit 25, using the laser microscope apparatus 51 according to this embodiment, will be described.

In this case, a laser light source (not illustrated) is operated to introduce IR pulsed laser light to the IR port 21. The IR pulsed laser light guided to the second light path 22 from the IR port 21 is transmitted through the second dichroic mirror 53 and the first dichroic mirror 56 and is guided to the XY galvanometer mirror 24. At the XY galvanometer mirror 24, the IR pulsed laser light is two dimensionally scanned on the specimen A. The IR pulsed laser light scanned in this way is transmitted through the pupil-projection lens 31, is deflected by the reflecting mirror 32, is transmitted through the image-forming lens 33, and is then radiated onto the specimen A by the objective lens 5.

At the focal plane of the objective lens 5 in the specimen A, the photon density of the IR pulsed laser light is high, bringing about a multiphoton excitation effect, which excites fluorescent material in the specimen A and produces multiphoton fluorescence. The multiphoton fluorescence produced is collected by the objective lens 5, imaged by the image-forming lens 33, and deflected by the reflecting mirror 32. The deflected multiphoton fluorescence is substantially collimated by the pupil-projection lens 31 and is guided to the XY galvanometer mirror 24. The multiphoton fluorescence passing via the XY galvanometer mirror 24 is transmitted through the first dichroic mirror 56 and is reflected towards the detection unit 25 by the second dichroic mirror 53.

The multiphoton fluorescence guided to the detection unit 25 is focused by a confocal lens 17, and only the multiphoton fluorescence produced at the focal plane in the specimen A passes through a pinhole 16. The multiphoton fluorescence passing through the pinhole 16 is transmitted by a light-splitting dichroic mirror 15 and a first barrier filter 14, thereby blocking unwanted light, and is detected as fluorescence intensity information by a first light detector 13.

By storing the intensity information of the multiphoton fluorescence detected by the first light detector 13 in this way in association with the irradiation position of the IR pulsed laser light by the XY galvanometer mirror 24, it is possible to construct a two-dimensional multiphoton fluorescence image.

Note that, in the multiphoton-fluorescence observation described above, it is possible to perform non-descan detection using a third light detector 45. In this case, the non-descan detection unit 4 is operated to move a third dichroic mirror 41 into the light path of the IR pulsed laser light and the fluorescence coming from the specimen A.

Next, the case where visible-light observation of the specimen A is performed using the laser microscope apparatus 51 according to this embodiment will be described.

In this case, a laser light source (not illustrated) is operated to introduce visible laser light to the VIS port 11. The visible laser light guided to the first light path 12 from the VIS port 11 is reflected towards the first dichroic mirror 56 by the reflecting mirror 58. The reflected visible laser light is reflected towards the XY galvanometer mirror 24 by the first dichroic mirror 56 and is guided to the XY galvanometer mirror 24. At the XY galvanometer mirror 24, the visible laser light is two-dimensionally scanned on the specimen A. The visible laser light scanned in this way is transmitted through the pupil-projection lens 31, is deflected by the reflecting mirror 32, is transmitted through the image-forming lens 33, and is then radiated onto the specimen by the objective lens 5.

At the focal plane of the objective lens 5 in the specimen A, fluorescent material in the specimen A is excited, producing fluorescence. The fluorescence produced is collected by the objective lens 5, is imaged by the image-forming lens 33, and is deflected by the reflecting mirror 32. The deflected fluorescence is substantially collimated by the pupil-projection lens 31 and is guided to the XY galvanometer mirror 24. The fluorescence passing via the XY galvanometer mirror 24 is transmitted through the first dichroic mirror 56 and is reflected towards the detection unit 25 by the second dichroic mirror 53.

The fluorescence guided to the detection unit 25 is collected by the confocal lens 17, and only the fluorescence produced at the focal plane in the specimen A passes through the pinhole 16. The fluorescence passing through the pinhole 16 is transmitted through the light-splitting dichroic mirror 15 and the first barrier filter 14, thereby blocking unwanted light, and is detected as fluorescence intensity information by the first light detector 13.

By storing the intensity information of the fluorescence detected by the first light detector 13 in this way in association with the irradiation position of the visible light by the XY galvanometer mirror 24, it is possible to construct a two-dimensional fluorescence image.

With the laser microscope apparatus 51 according to this embodiment, similarly to the first embodiment, when performing multiphoton-fluorescence observation, the IR pulsed laser light is radiated onto the specimen without the involvement of reflection at individual dichroic mirrors formed of multilayer films. Therefore, it is possible to prevent optical path length variations at each wavelength due to reflection, and to prevent pulse width broadening due to group velocity dispersion of the IR pulsed laser light. As a result, it is possible to efficiently bring about a multiphoton fluorescence effect in the specimen, thus enabling observation with bright, clear multiphoton fluorescence images.

By constructing the first dichroic mirror 56 so as to be capable of switching among the plurality of dichroic mirror parts 55a and 55b having different transmittance characteristics, it is possible to switch among the plurality of dichroic mirror parts 55a and 55b having different transmittance characteristics according to the wavelength of the visible laser light. Accordingly, the wavelength of the visible laser light can be changed according to the observed object, and fluorescence can be produced by irradiating the specimen A with that visible laser light, thus allowing observation of various kinds of objects.

What is claimed is:

1. A laser microscope apparatus comprising:
a first light path via which visible laser light is guided;
a second light path via which ultrashort pulsed laser light is guided;
a first dichroic mirror that reflects the visible laser light guided via the first light path and that transmits the ultrashort pulsed laser light guided via the second light path to combine the first light path and the second light path;
a scanning device that scans the laser light from the first dichroic mirror on a specimen;
an observation optical system that irradiates the specimen with the laser light scanned by the scanning device and that collects fluorescence produced in the specimen;
a second dichroic mirror that reflects the visible laser light and transmits the fluorescence from the specimen; and
a detector that detects the fluorescence transmitted through the second dichroic mirror,
wherein the first dichroic mirror is provided between the scanning device and the second dichroic mirror and reflects the fluorescence coming from the specimen towards the second dichroic mirror.

2. A laser microscope apparatus according to claim 1, wherein the second dichroic mirror comprises:
   a plurality of dichroic mirror parts having different spectral transmittance characteristics; and
   a switching unit that switches among the plurality of dichroic mirror parts.

3. A laser microscope apparatus according to claim 1, wherein the first dichroic mirror and the scanning device are provided in a straight-through light path portion of the second light path.

4. A laser microscope apparatus according to claim 1, further comprising:
   a third dichroic mirror that is provided, in an insertable fashion, between the scanning device and the specimen, that reflects the fluorescence coming from the specimen, and that transmits the ultrashort pulsed laser light; and
   a non-descan detection unit that detects the fluorescence reflected by the third dichroic mirror.

5. A laser microscope apparatus comprising:
   a first light path via which visible laser light is guided;
   a second light path via which ultrashort pulsed laser light is guided;
   a first dichroic mirror that reflects the visible laser light guided via the first light path and that transmits the ultrashort pulsed laser light guided via the second light path to combine the first light path and the second light path;
   a scanning device that scans the laser light from the first dichroic mirror on a specimen;
   an observation optical system that irradiates the specimen with the laser light scanned by the scanning device and that collects fluorescence produced in the specimen;
   a second dichroic mirror that reflects the fluorescence from the specimen and that transmits the ultrashort pulsed laser light; and
   a detector that detects the fluorescence reflected by the second dichroic mirror,
   wherein the first dichroic mirror is provided between the scanning device and the second dichroic mirror and transmits the fluorescence coming from the specimen.

6. A laser microscope apparatus according to claim 5, wherein the first dichroic mirror comprises:
   a plurality of dichroic mirror parts having different spectral transmittance characteristics; and
   a switching unit that switches among the plurality of dichroic mirror parts.

7. A laser microscope apparatus according to claim 5, wherein the first dichroic mirror and the scanning device are provided in a straight-through light path portion of the second light path.

8. A laser microscope apparatus according to claim 5, further comprising:
   a third dichroic mirror that is provided, in an insertable fashion, between the scanning device and the specimen, that reflects the fluorescence coming from the specimen, and that transmits the ultrashort pulsed laser light; and
   a non-descan detection unit that detects the fluorescence reflected by the third dichroic mirror.

* * * * *